United States Patent [19]

Hiramoto et al.

[11] Patent Number: 5,192,139
[45] Date of Patent: Mar. 9, 1993

[54] APPARATUS FOR COOLING A SPINDLE BEARING OF A MACHINE

[75] Inventors: Kazuyuki Hiramoto, Atsugi; Hiromi Hara, Aiko; Akihiro Mochizuki, Zama, all of Japan

[73] Assignee: Makino Milling Maching Co., Ltd., Tokyo, Japan

[21] Appl. No.: 701,179

[22] Filed: May 16, 1991

[30] Foreign Application Priority Data

| May 21, 1990 | [JP] | Japan | 2-129010 |
| Jun. 29, 1990 | [JP] | Japan | 2-170217 |
| Dec. 21, 1990 | [JP] | Japan | 2-404935 |
| Dec. 27, 1990 | [JP] | Japan | 2-407719 |

[51] Int. Cl.$^5$ .................... F16C 19/52; F16C 33/66
[52] U.S. Cl. ........................... 384/476; 384/475
[58] Field of Search ............... 384/313, 316, 317, 321, 384/476, 473, 475, 493, 557, 900

[56] References Cited

U.S. PATENT DOCUMENTS

| 2,040,803 | 5/1936 | Buckwalter | 384/475 |
| 2,944,857 | 7/1960 | Schneider | 384/475 |
| 3,195,965 | 7/1965 | Van Dorn |  |
| 3,240,541 | 3/1966 | Levesque | 384/321 |
| 3,269,786 | 8/1966 | Diver et al. | 384/475 |
| 3,480,342 | 11/1969 | Venable | 384/476 |
| 3,531,167 | 9/1970 | Edge et al. | 384/475 |
| 4,334,720 | 6/1982 | Signer | 384/475 |

FOREIGN PATENT DOCUMENTS

| 0090281 | 10/1983 | European Pat. Off. |
| 493631 | 2/1930 | Fed. Rep. of Germany |
| 596994 | 4/1934 | Fed. Rep. of Germany |
| 1942249 | 3/1971 | Fed. Rep. of Germany |
| 689359 | 9/1930 | France |
| 63-231021 | 9/1988 | Japan |
| 2-224945 | 9/1990 | Japan |
| 685856 | 9/1979 | U.S.S.R. ............... 384/476 |

Primary Examiner—Thomas R. Hannon
Attorney, Agent, or Firm—Leydig, Voit & Mayer

[57] ABSTRACT

A rolling-contact type bearing for rotatably supporting a spindle of a machine is cooled by a temperature controlled liquid lubricant supplied to an internal cavity or passageways provided in the spindle, and circulated toward the bearing so that the temperature controlled liquid lubricant comes into direct or indirect contact with the bearing in the order of the inner race, the rolling element, and the outer recess, to thereby apply a cooling and lubricating effect to those elements. The lubricant after cooling is collected to a lubricant-temperature controller to be subjected to a temperature control treatment for reuse as a coolant. An air seal is applied to a lubricant entrance of the spindle where the temperature controlled lubricant is supplied from a lubricant supply member into the spindle, to thereby prevent a leakage of the lubricant toward the exterior.

22 Claims, 11 Drawing Sheets

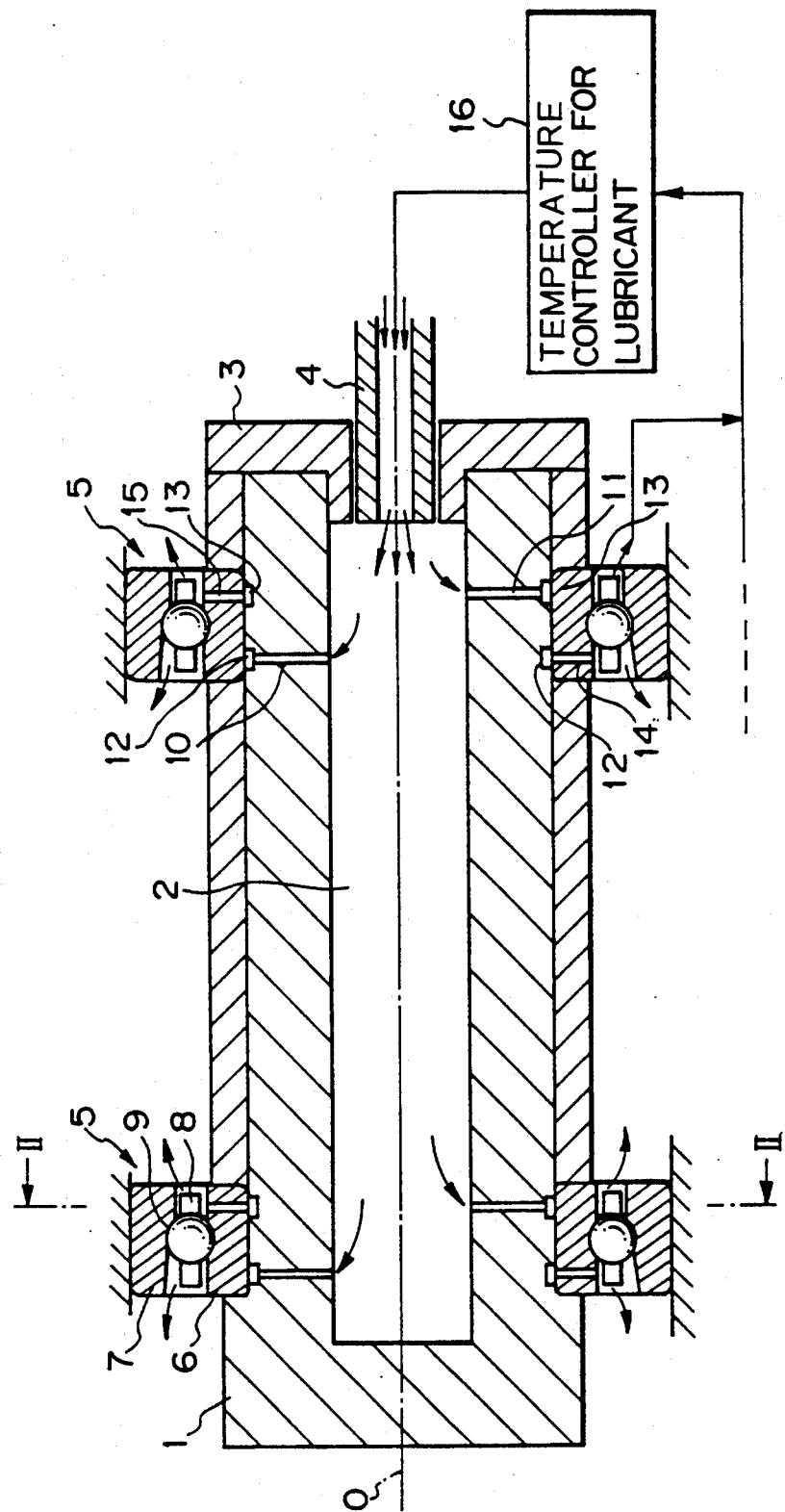

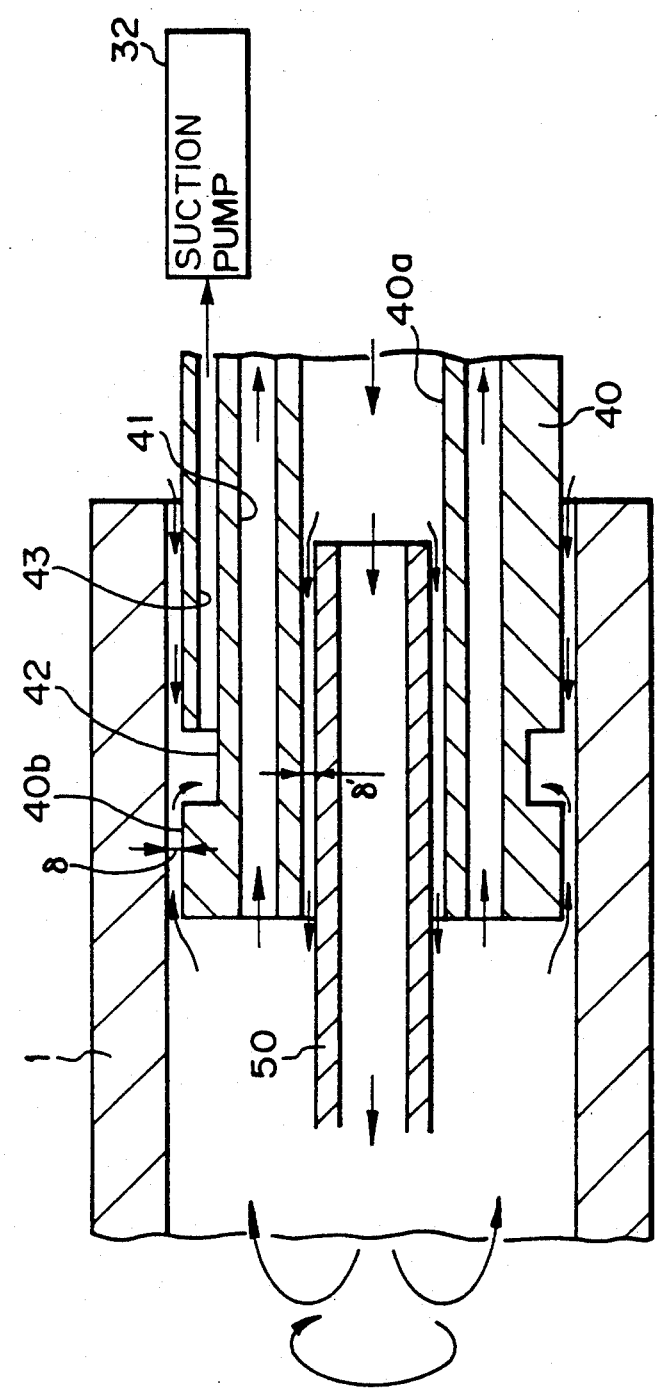

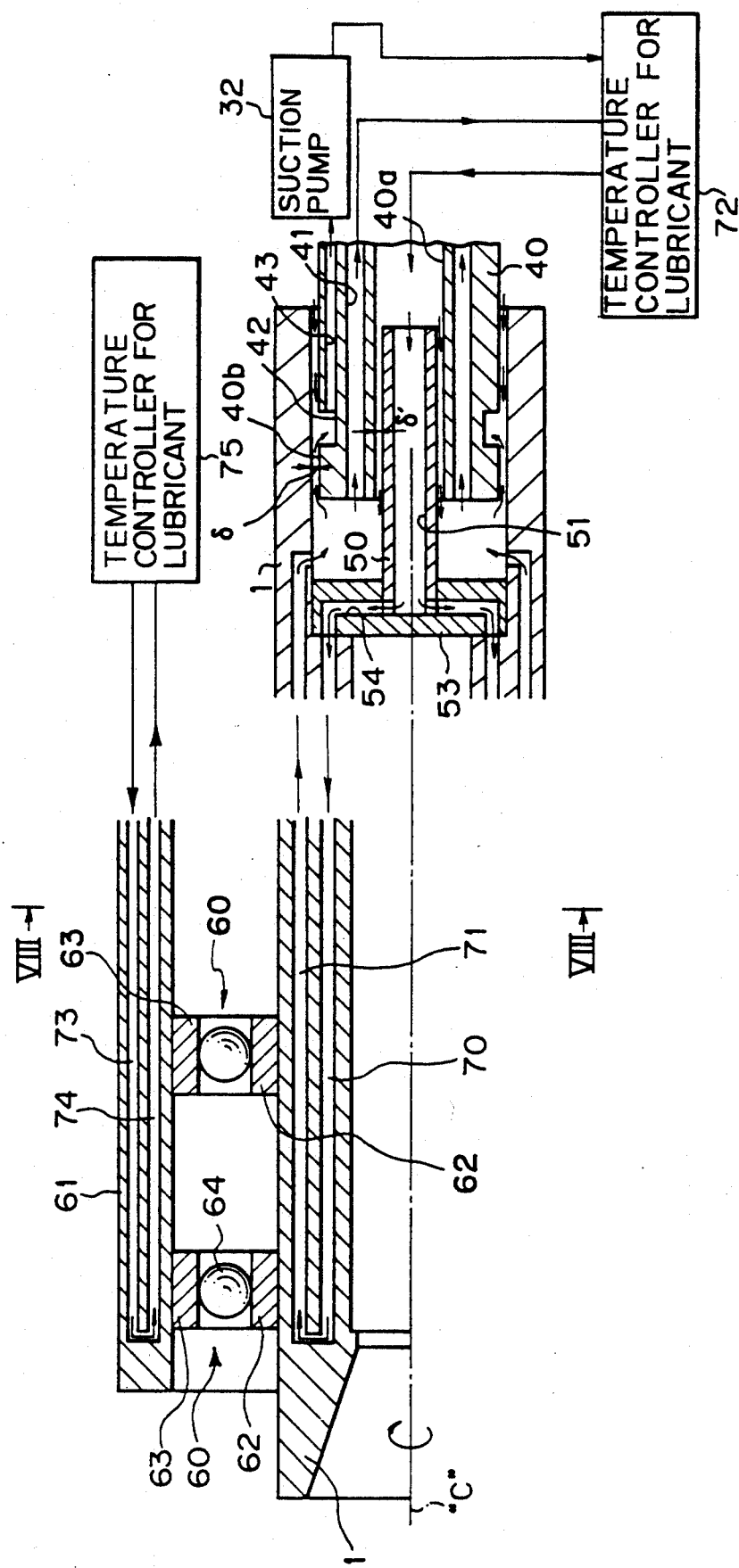

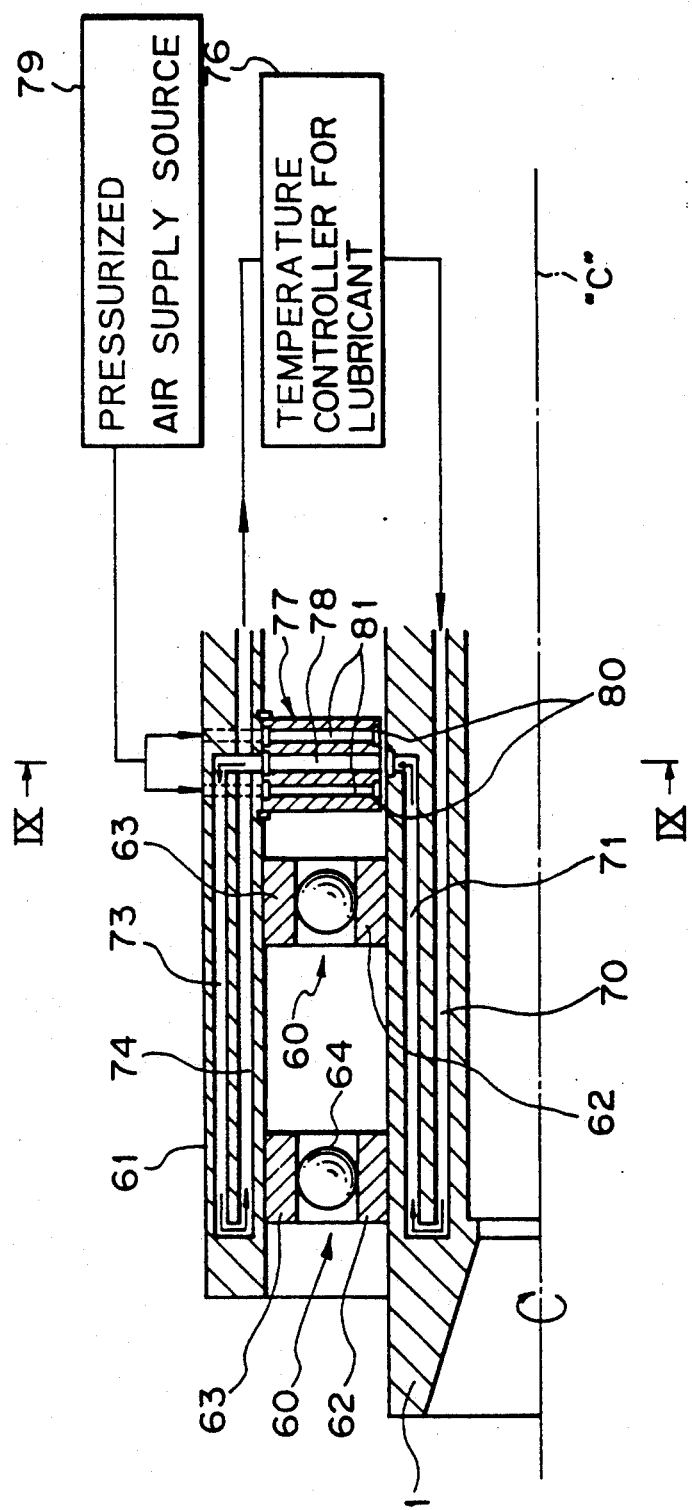

APPARATUS FOR COOLING A SPINDLE BEARING OF A MACHINE

BACKGROUND OF THE INVENTION

1. Field of the Invention

The present invention generally relates to an apparatus for cooling bearings rotatably supporting a spindle of a machine. More particularly, the present invention relates to an apparatus for cooling rolling-contact type bearings for supporting a spindle, especially a spindle to be rotated at a high speed. The apparatus for cooling the high speed spindle bearings according to the present invention may be used with spindle bearings of, e.g., a machine tool such as a lathe, a milling machine, and a machining center, and various turbine shafts.

2. Description of the Related Art

For example, a spindle of a machine tool is rotatably supported by rolling-contact type bearings including rolling elements therein, and can be rotated at a high speed. Therefore, the higher the rotational speed of the spindle, as well as the larger a cutting load applied to the spindle bearings, the greater an amount of heat generated by the spindle bearings. Such an increase in the amount of heat generated by the spindle bearings causes a thermal deformation of the spindle, and thus reduce the accuracy of the machining by the machine tool, and will often lead to a seizing of the bearings. Accordingly, the spindle bearings supporting a spindle of a machine to be rotated at a high speed must be cooled during the rotation of the spindle.

One typical known method of cooling a bearing mounted in a housing, for rotatably supporting a shaft or a spindle, is carried out in a manner such that a flow of a liquid coolant is fed to the housing at positions adjacent to the outer race of the bearing, to thereby cool the bearing at the outer periphery thereof. In another known method, a liquid lubricant in the form of a liquid jet is directly spouted toward the ball bearings or roller elements and the track of the bearing, to both cool and lubricate the bearing. In these known methods, although the outer races of the bearings are effectively cooled, the inner races of the bearings often cannot be cooled, and accordingly, a problem occurs in that a thermal expansion of the outer race is different from that of the inner race of the same bearing. To solve this problem, different bearing cooling methods have been proposed, and recently adopted, to supply bearing balls or roller elements of a bearing with a liquid lubricant radially inside the bearing. Namely, in one of these methods, a flow of a liquid coolant is fed to interior of a rotating shaft or spindle supported by a bearing, to intentionally cool the inner race of the bearing, via the shaft or spindle. In another method, a liquid lubricant is supplied into an axial bore of a shaft or spindle, and the flow of lubricant is then fed from the axial bore into radial passageways which are formed to run radially through the shaft or the spindle and the inner race of the bearing, so that the lubricant reached the ball bearings or roller elements after passing through the inner race, and thus the liquid lubricant lubricates and cools the bearing from the inside thereof. Japanese Unexamined Patent Publications ( Kokai ) Nos. 63-231021 and 2-224945 disclose a spindle bearing cooling apparatus, respectively, which is constructed and operated in accordance with the principle of the above-mentioned method, i.e., the method of an intentional cooling of the inner race of a bearing.

In the apparatus of Japanese Unexamined Patent publication ( Kokai ) 2-224945, a part of a flow of a liquid lubricant supplied into the spindle is fed through the spindle at a part thereof located adjacent to the inner races of a pair of spindle bearings, and collected through an oil discharge passageway formed in a housing in which the spindle bearings are seated. The other part of the liquid lubricant is not permitted to flow through the part of the spindle adjacent to the inner races of the bearings, but is fed through an oil passageway formed in a portion of the housing far from the spindle housings and collected in an oil jacket radially spaced from the outer races of the spindle bearings, and then fed through another oil discharge passageway formed in a sleeve element arranged around the housing, to thereby apply a cooling effect to the outer races of the spindle bearings. Therefore, the temperatures of the part of the liquid lubricant cooling the inner races of the bearings and that of the part of the liquid lubricant cooling the outer races of the spindle bearings are substantially the same. Nevertheless, although heat generated by a spindle bearing is usually transmitted toward the outside thereof and easily radiated from the outer race of the spindle bearing, the heat is not easily radiated from but stays inside the inner race thereof, and thus the temperature of the inner race of the bearing is higher than that of the outer race. Accordingly, an expansion of the inner race is larger than that of the outer race, and as a result, the ball bearings or roller elements are subjected to a compression force which leads to an increase in a resistance of the races to the rotation of the ball bearings or roller elements. Therefore, this increase in the heat generated by the spindle bearing shortens the operating life of the spindle bearing or cause a seizing thereof. To solve this problem, a spindle bearing mounted in a housing for rotatably supporting a spindle fitted in the inner race thereof must be cooled in such a manner that the temperature of the inner race thereof is kept lower than that of the outer race, during rotation of the spindle. Nevertheless, Japanese Unexamined Patent Publication 2-224945 neither suggests nor teaches the necessity of keeping the temperature of the inner race lower than that of the outer race of the spindle bearing.

In the apparatus for lubricating a rolling bearing, as disclosed in Japanese Unexamined Patent Publication ( Kokai ) No. 63-231021, a liquid lubricant is introduced into axial grooves formed in the outer circumference of a spindle, and the lubricant is then supplied to the rolling elements, such as bearing balls, via radial grooves formed in the opposite end faces of the inner race of the spindle bearing. Therefore, when the liquid lubricant flows through the radial grooves of the inner race of the spindle bearing, a cooling of the inner race is carried out by the liquid lubricant. Nevertheless, the cooling of the inner race of the spindle bearing of this apparatus is unsatisfactory because when heat is generated by the spindle bearing, the heat is mainly transmitted from an entire cylindrical inner face of the inner race of the spindle bearing to an entire cylindrical outer face of the spindle, due to the contact of the inner cylindrical face of the inner race with the entire cylindrical outer face of the spindle. Nevertheless, the flow of the liquid lubricant in the radial grooves of the inner race cannot be brought into contact with an entire cylindrical face of the inner race, and the liquid lubricant flowing in the axial grooves of the spindle is not able to directly remove heat from and cool an entire cylindrical surface of the spindle.

Accordingly, the spindle bearing cooling technique known from Japanese Unexamined Patent Publications (Kokai) Nos. 2-224945 and 63-231021 are unsatisfactory from the viewpoint of the cooling of a spindle bearing by a liquid lubricant, and accordingly, an improvement thereof is required.

Furthermore, in the above-mentioned spindle bearing method of cooling by a liquid lubricant supplied from radially inside the inner race, a large amount of liquid lubricant must be supplied to apply an even cooling effect to the entire circumference of the spindle bearing. Namely, a very large amount of liquid lubricant must be supplied into a cavity of a spindle, i.e., an axial bore of the spindle supported by the bearing, so that the liquid lubricant flows out of the cavity toward the bearing through many hole-like radial passageways of the spindle formed therein, and through many corresponding radial passageways formed in the inner race of the spindle bearing. Nevertheless, when the spindle is rotated at a high speed, portions of the bearing are not sufficiently cooled by the liquid lubricant which passes through the radial passageways of the inner race, and thus the thermal expansion among portions of the bearing is different and thus the accuracy of the roundness of the rolling tracks of the inner and outer races is reduced. As a result, various defects, such as an increase of noise during the running of the spindle bearing and a shortening of the operating life of the spindle bearing, appear.

Moreover, when the liquid lubricant is supplied into the cavity of the spindle rotated at a high speed, a piping element is used for introducing the liquid lubricant into the cavity of the spindle. Namely, an end of the piping element is inserted into an opening of an end of the spindle via a small radial gap therebetween, to prevent the piping element from coming into contact with the spindle, and the cavity of the spindle is maintained in a negative pressure state to thereby permit air to enter the cavity of the spindle from the atmosphere via the small air gap, to thus prevent a flow of the liquid lubricant out of the cavity of the spindle toward the outside thereof through the small air gap. Namely, an air seal is formed between the piping element and the spindle opening, and prevents a seizing of the piping element when the spindle is rotated at a high speed. When the spindle is rotated at a high speed, the liquid lubricant supplied by the piping element into the interior of the spindle is urged toward and attached to the inner wall of the cavity of the spindle, under a centrifugal force, but on the other hand, the air entering the interior of the spindle remains there as a mass of air. At this stage, when considering the distribution of the liquid lubricant within the cavity of the spindle, i.e., in the axial bore of the spindle, it can be understood that such a lubricant distribution is complicatedly varied in response to a change in an amount of the liquid lubricant supplied to the bearing through respective radial passageways of the spindle under a centrifugal force. Particularly, when a rotating speed of the spindle is increased, an axial distribution of the liquid lubricant in the axial bore of the spindle varies greatly. For example, when a spindle is supported by two bearings located at a position A adjacent to the end of the lubricant supply piping and another position B far from the end of the lubricant supply piping, the liquid lubricant distributed in the axial bore of the spindle at a position near to the above-mentioned position A is substantially equal to that at a position near to the above-mentioned position B, during the rotation of the spindle at a low speed. When the rotating speed of the spindle is increased, however, the distribution of the liquid lubricant at the position near to the position A is reduced, and the distribution of the liquid lubricant at the position near to the position B is greatly increased. Accordingly, the bearing supporting the spindle at the position A is not sufficiently lubricated compared with the bearing supporting the spindle at the position B, and thus a seizing of the former bearing occurs due to a lack of lubrication.

SUMMARY OF THE INVENTION

Therefore, an object of the present invention is to obviate the above-mentioned defects encountered by the known method and apparatus for cooling spindle bearings.

Another object of the present invention is to provide a novel apparatus for cooling spindle bearings of a machine, whereby the spindle bearings are constantly and equivalently lubricated and cooled by a supply of a small amount of a liquid lubricant.

A further object of the present invention is to provide an apparatus for cooling spindle bearings of a machine by a liquid lubricant supplied through an axially extended cavity and radially bored liquid passageways of the spindle, which is able to ensure an even distribution of the liquid lubricant in the axially extended cavity of the spindle even when the spindle is rotated at a high speed, whereby an abnormal operation of the spindle bearings due to a lack of the liquid lubricant can be avoided.

A still further object of the present invention is to provide an apparatus for cooling spindle bearings of a machine, by which an unequal elevation of the temperatures of the outer and inner races of the spindle bearings in a high rotating speed range of the spindle is prevented.

A further object of the present invention is to provide an apparatus for cooling spindle bearings of a machine, which apparatus is provided with an effective sealing means for preventing a leakage of a liquid lubricant at a point at which the liquid lubricant is supplied from an end of lubricant supply piping into a cavity bored in the spindle.

In accordance with one aspect of the present invention, there is provided an apparatus for cooling a bearing for rotatably supporting a spindle of a machine by a liquid lubricant supplied to a cavity of the spindle, the bearing including an inner race fitted on an outer cylindrical face of the spindle, an outer race held stationarily in a housing element of the machine, and rolling elements held rotatably in tracks of the inner and outer races, comprising in combination:

a first means for centrifugally urging said liquid lubricant to flow from said cavity of said spindle toward said outer cylindrical face of said spindle when said spindle is rotated, said first means comprising at least one radial lubricant passageway provided in said spindle and radially extended from said cavity toward said outer cylindrical face of said spindle;

a second means for permitting said liquid lubricant to flow in a circumferential direction on said outer cylindrical face of said spindle when said liquid lubricant flowing from said cavity of said spindle reaches said outer cylindrical face, said second means comprising an annularly extended recess provided in at least one of a cylindrical inner face of said inner race of said bearing and said outer cylindrical face of said spindle, said annularly extended recess being communicated with said radial lubricant passageway of said spinlde;

a third means for permitting said liquid lubricant to be spouted from said annularly extended recess into a space between said inner and outer races of said bearing, to thereby enable said lubricant to come into contact with said rolling elements and said tracks of said inner and outer races when said spindle is rotated, said third means comprising at least one radial lubricant passageway provided in said inner race and radially extended from said annularly extended recess toward an outer cylindrical face of said inner race having said track thereof, said radial lubricant passageway being spaced in a circumferential direction from said radial lubricant passageway of said spindle; and a fourth means for returning said liquid lubricant from said space between said inner and outer races of said bearing to a predetermined lubricant receiving means for receiving said liquid lubricant returned from said bearing, and applying a temperature control treatment to said returned liquid lubricant.

In accordance with another aspect of the present invention, there is provided an apparatus for cooling a bearing for rotatably supporting a spindle in a housing of a machine by a liquid lubricant supplied to an axial extended cavity of the spindle, the bearing including an inner race fitted tightly on an outer cylindrical face of the spindle, an outer race stationarily seated in the housing, and rolling elements rotatably held between the inner and outer races thereof, comprising:

a first means for supplying said axially extended cavity of said spindle with the liquid lubricant, via an end of said spindle from an exterior of said spindle;

a second means for permitting said liquid lubricant to flow from said axially extended cavity of said spindle toward an interior of said bearing, said second means comprising lubricant passageways running radially from said cavity of said spindle toward said interior of said bearing through said spindle and said inner race of said bearing;

a lubricant returning means for permitting said liquid lubricant to return from said interior of said bearing to said first means;

a flow regulating means for setting an amount of said liquid lubricant supplied from said first means to said axially extended cavity of said spindle in an amount larger than an amount of said liquid lubricant passing through said lubricant passageways of said spindle and said inner race of said bearing;

a third means for collecting excess liquid lubricant overflowing from said axially extended cavity of said spindle, via said end of said spindle, said third means returning said collected lubricant to said first means; and a temperature controller for applying a temperature control treatment to said liquid lubricant before said liquid lubricant is supplied by said first means to said spindle.

In accordance with a further aspect of the present invention, there is provided an apparatus for cooling a bearing for rotatably supporting a spindle in a housing of a machine by a liquid lubricant supplied in an axially extended cavity of the spindle, the bearing including an inner race fitted tightly on an outer cylindrical face of the spindle, an outer race stationarily seated in the housing, and rolling elements rotatably held between the inner and outer races thereof, comprising:

a first means for generating a first flow of a temperature controlled liquid lubricant through an interior of said spindle to thereby cool said inner race of said bearing;

a second means for generating a second flow of a temperature controlled liquid lubricant through an interior of said housing of said machine to thereby cool said outer race of said bearing; and a third means for setting a temperature of said first flow of the temperature controlled liquid lubricant at a level lower than that of said second flow of the temperature controlled liquid lubricant.

BRIEF DESCRIPTION OF THE DRAWINGS

The above and other objects, features and advantages of the present invention will be made more apparent from the ensuing description of the embodiments with reference to the accompanying drawings wherein:

FIG. 1A is a longitudinal cross-sectional view of an apparatus for cooling a spindle bearing of a machine according to an embodiment of the present invention;

FIG. 7 is a cross-sectional view of an air seal construction provided between a rear end of a spindle of a machine tool and liquid lubricant supply and return piping according to an embodiment of the present invention;

FIG. 8A is a partial cross-sectional view of an apparatus for cooling a spindle bearing according to a further embodiment of the present invention;

FIG. 9A is a view similar to FIG. 8 and illustrating a spindle bearing cooling apparatus according to a still further embodiment of the present invention;

DESCRIPTION OF THE PREFERRED EMBODIMENTS

Figure 1B:
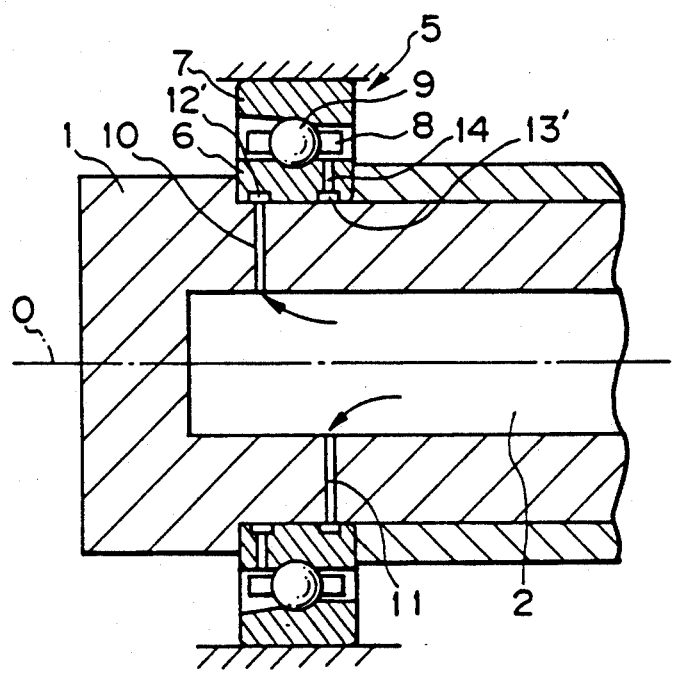
FIG. 1B is a cross-sectional view of a part of a spindle bearing cooling apparatus according to a modification of the embodiment of FIG. 1A.
Figure 2:
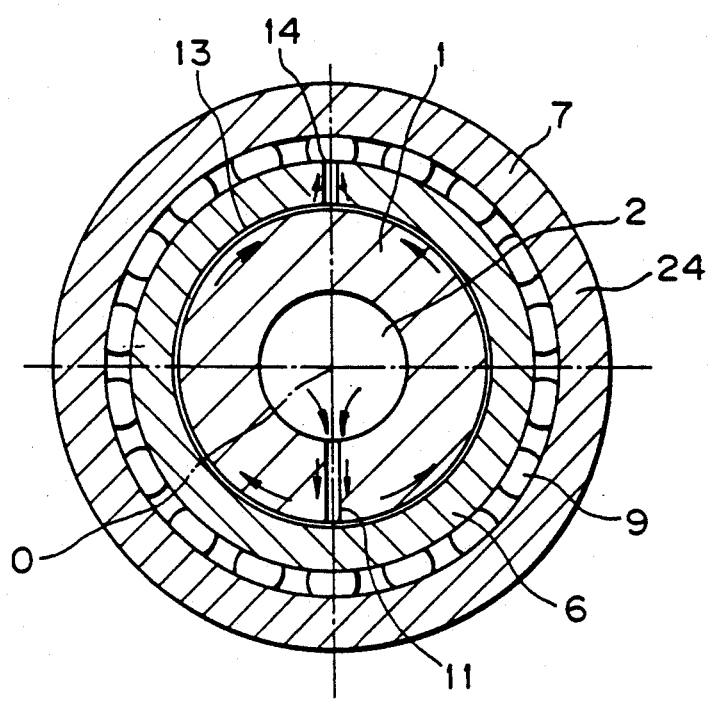
FIG. 2 is a vertical cross-sectional view taken along the line II—II of FIG. 1A.

Referring to FIGS. 1A and 2, a spindle 1 is supported by two rolling-contact type bearings 5 arranged to be axially spaced from one another. Namely, front and rear portions of the spindle 1 are supported by the bearings 5. The spindle 1 is formed as an open ended hollow shaft member provided with a cavity 2 axially extended along a center line "O" of a shaft member, and the open end thereof is closed by an end cap member 3 having a central opening therein. A lubricant supply piping 4 having one end fitted in the central opening of the end cap member 3 is connected, at the other end thereof, to a lubricant supply pump accommodated in a temperature controller 16 for a lubricant ( hereinafter referred to as a lubricant-temperature controller ), a liquid lubricant is supplied to the axially extended cavity 2 of the spindle 1 by the lubricant supply piping 4. Each of the rolling-contact type bearings 5 has an inner race 6, an outer race 7, and a plurality of rolling elements 9 i.e., steel balls, rotatably held in position by a retainer 8. The inner race 6 is fixed to the outer circumference of the spindle 1 and the outer race 7 is stationarily mounted at a fixed position, and accordingly, the spindle 1 is rotatable with the inner race 6, with respect to the outer race 7, via rolling elements 9.

The spindle 1 is provided with a pair of radial lubricant passageways 10 and 11 through which a liquid lubricant is supplied from the cavity 2 to each of the two bearings 5. Namely, the first pair of radial passageways 10 and 11 are arranged at a position of the spindle 1 suitable for supplying the liquid lubricant from the cavity 2 to the front side bearing 5 ( left hand side in FIG. 1A ), and the second pair of radial passageways 10 and 11 are arranged at a position of the spindle 1 suitable for supplying the liquid lubricant from the cavity 2 to the rear side bearing 5 ( right hand side in FIG. 1A ). The radial lubricant passageways 10 and 11 of each of the first and second pairs are circumferentially spaced apart by approximately 180 degrees with respect to the center line "O" of the spindle 1, and axially spaced apart from one another as clearly illustrated in FIG. 1A, so that the lubricant passageways 10 and 11 are radially extended to open ends thereof at positions corresponding to the left and right hand portions of the inner race 6, respectively. The spindle 1 is further provided with a pair of annular lubricant grooves 12 and 13 formed in the outer circumference thereof at positions corresponding to each of the two front and rear bearings 5. The annular lubricant grooves 12 and 13 in the form of a rectangular recess, when viewed along the longitudinal cross-section of the spindle 1, are provided to pass through the opening of the above-mentioned radial lubricant passageways 10 and 11, respectively.

The inner race 6 of each bearing 5 is provided with radial lubricant passageways 14 and 15 formed to radially pierce therethrough. Namely, the radial lubricant passageway 14 of the inner race 6 is arranged to provide a fluid communication between the annular lubricant passageway 12 of the spindle 1 and the interior of the bearing 5, and disposed to be circumferentially spaced by 180 degrees from the radial lubricant passageway 10 of the spindle 1, in a plane perpendicular to the center line "O" of the spindle 1. The radial lubricant passageway 15 of the inner race 6 is arranged to provide a fluid communication between the annular lubricant passageway 13 of the spindle 1 and the interior of the bearing 5, and disposed to be circumferentially spaced by 180 degrees from the radial lubricant passageway 11 of the spindle 1, in a plane perpendicular to the center line "O" of the spindle 1.

When the liquid lubricant is supplied into the cavity 2 of the spindle 1 through the lubricant supply piping 4 during the rotating of the spindle 1 while supported by the front and rear rolling-contact type bearings 5, the lubricant is subjected to a centrifugal force due to the rotation of the spindle 1, and thus urged radially outwardly to thereby adhere to the inner wall of the cavity 2 of the spindle 1. The lubricant is further forced into the radial lubricant passageways 10 and 11 and is then discharged into the annular grooves 12 and 13 of the spindle 1. When discharged into the annular grooves 12 and 13, the lubricant is separated into two circumferential flows of the lubricant in the opposite directions in each of the annular grooves 12 and 13. These flows of the lubricant are moved over one half an arc of each of th annular lubricant grooves 12 and 13 while in contact with the inner face of the inner race 6 of each bearing 5, and eventually flow into the radial lubricant passageways 14 and 15 of the inner race 6 of each bearing 5. During the movement of the flows of lubricant in each of the annular lubricant grooves 12 and 13, the entire circumference of the round face of the inner race 6 is evenly cooled thereby.

The liquid lubricant flowing into the radial lubricant passageways 14 and 15 is centrifugally spouted in the interior of the bearing 5 to lubricate and cool the rolling elements 9, i.e., the steel balls and the tracks of the inner and outer races 6 and 7, and is then discharged outside the bearing 5. The discharged liquid lubricant is thereafter gathered into the lubricant-temperature controller 16 for a temperature control thereof. Namely, the temperature of the lubricant is lowered to a predetermined level, and after the temperature control, the liquid lubricant is delivered toward the lubricant supply piping 4 for reuse, from the lubricant-temperature controller 16 which includes a lubricant collecting pump and a lubricant delivery pump.

In the embodiment of FIGS. 1A and 2, although the annular lubricant grooves 12 and 13 are provided in the outer circumference of the spindle 1, these grooves 12 and 13 may be alternatively provided in the inner cylindrical face of the inner race 6 of each bearing 5, as illustrated in FIG. 1B, to permit a circumferential flow of the liquid lubricant therein.

Further, in the embodiment of FIGS. 1A and 2, one radial lubricant passageway 10 of the spindle 1 and one radial lubricant passageways 14 of the inner race 6 of the bearing 5 are disposed to be cicumferentially spaced by 180 degrees from one another in a plane perpendicular to the central axis "O" of the spindle 1, and similarly, one radial lubricant passageway 11 of the spindle 1 and one radial lubricant passageways 15 of the inner race 6 of the bearing 5 are disposed to be circumferentially spaced by 180 degrees from one another in a different plane perpendicular to the central axis "O" of the spindle 1. Alternatively, a plurality of radial lubricant passageways 10 of the spindle 1 disposed to be circumferentially equidistantly spaced apart from one another and a plurality of radial lubricant passageways 14 of the inner race 6 of the bearing disposed to be circumferentially equidistantly spaced apart from one another may be arranged in such a manner that the former passageways 10 and latter passageways 14 are circumferentially shifted in a plane perpendicular to the central axis "O" of the spindle 1. An equal arrangement should be applied to a plurality of radial lubricant passageways 11 of the spindle 1 and a plurality of radial lubricant passageways 15 of the inner race 6 of the bearing 5.

Figure 4:
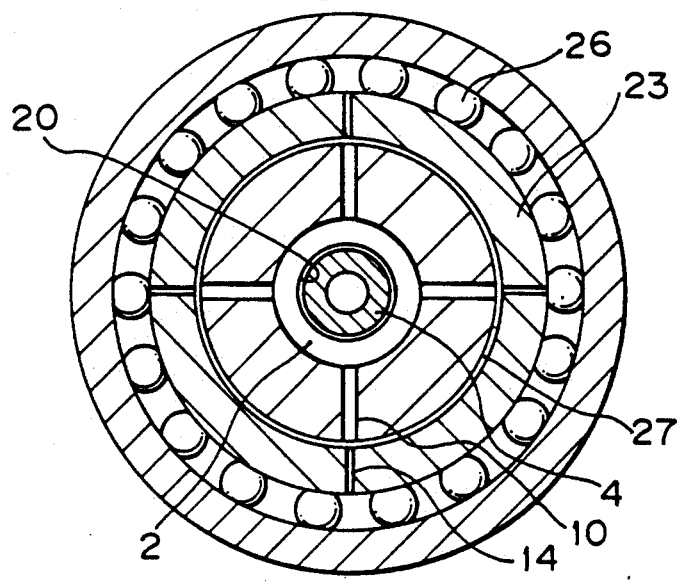
FIG. 4 is a vertical cross-sectional view taken along the line IV—IV of FIG. 3.
Figure 3:
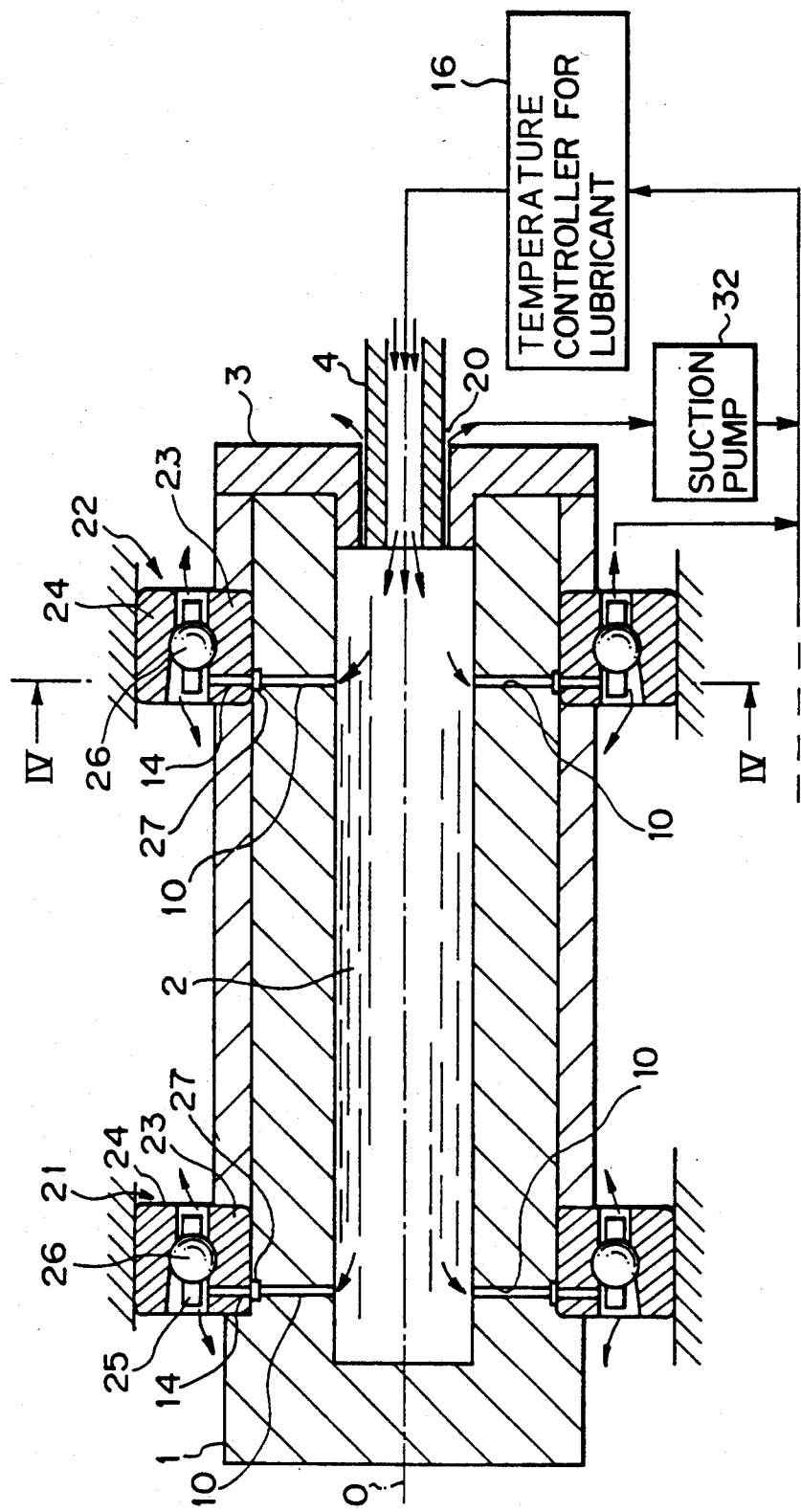
FIG. 3 is a longitudinal cross-sectional view of an apparatus for cooling a spindle bearing of a machine according to another embodiment of the present invention.

Referring to FIGS. 3 and 4, illustrating a different embodiment of the present invention, the same reference numerals as FIGS. 1A, 1B and 2 designate similar elements to those of the afore-mentioned embodiment.

As will be understood from the comparison with the illustration of FIGS. 1A and 2, the spindle 1 of this embodiment is also provided with an axial cavity 2 formed therein to be axially extended along the center line "O" from an open end thereof, which is closed by an end cap member 3 having a central opening thereof. An end of a lubricant supply piping 4 is inserted in the opening of the end cap 3 to supply a liquid lubricant in the cavity 2 of the spindle, and the other end of the lubricant supply piping 4 is connected to a lubricant supply pump accommodated in the lubricant-temperature controller 16. The end of the lubricant supply piping 4 is kept from contact with the end cap 3, i.e., a predetermined small annular gap 20 axially extended by an appropriate length is provided between the outer circumference of the inserted end of the lubricant supply piping 4 and the cylindrical wall of the opening of the end cap 3. The spindle 1 is rotatably supported by two rolling-contact type bearings 21 and 22 at two spaced positions. The two bearings 21 and 22, i.e., the front and rear side bearings 21 and 22 are mounted in a bearing casing or housing ( schematically shown in FIG. 3 ), and axially positioned by a cylindrical spacing member disposed between the two bearings 21 and 22 and the other cylindrical spacing member positioned between the rear side bearing 22 and the end cap 3 as shown in FIG. 3. Each of the two rolling-contact bearings 21 and 22 includes an inner race 23 fitted on the spindle 1, an outer race 24 held by the bearing casing, and rotatable rolling elements 26 consisting of a plurality of bearing balls kept in position by a retainer element 25. The inner race 23 is rotatable with the spindle 1 with respect to the outer race 24.

The spindle 1 is provided with two groups of a plurality of radial lubricant passageways 10 extending radially from the cavity 2 toward the outer surface of the spindle 1. Namely, the first group is arranged at a position corresponding to the front side bearing 21, and the second group is arranged at a position corresponding to the rear side bearing 22. Each of the first and second groups of radial lubricant passageways 10 is communicated with an annular groove 27 recessed in the outer surface of the spindle 1 at a position corresponding to each of the bearings 21 and 22. The first group of radial lubricant passageways 10 are arranged to be equiangularly spaced from one another with respect to the central axis "O" of the spindle 1, and similarly, the second group of radial lubricant passageways 10 are arranged to be equiangularly spaced from one another.

The inner race 23 of each of the front and rear bearings 21 and 22 is provided with a plurality of radial lubricant passageways 14 formed therein, which provide a fluid communication between the cavity 2 of the spindle 1 and the interior of each of the bearings 21 and 22 via the above-mentioned radial lubricant passageways 10 and the annular grooves 27. Namely, the radial lubricant passageways 14 of the inner race 23 of the front and rear bearings 21 and 22 are positioned in a plane extended perpendicularly to the central axis "O" of the spindle 1 and containing therein the above-mentioned radial lubricant passageways 10 and the annular groove 27 of the spindle 1.

The liquid lubricant is supplied to fill the cavity 2 of the spindle 1 by the lubricant supply piping 4, and an excessive lubricant is discharged from the cavity 2 toward the outside the spindle 1 through the annular gap 20. The lubricant filling the cavity 2 of the spindle 1 is centrifugally urged to flow into the interior of the front and rear side bearings 21 and 22 via the radial lubricant supply passageways 10 and the annular grooves 27 of the spindle 1 and the radial lubricant passageways 14 of the inner races 23 of the bearings 21 and 22 when the spindle 1 is rotated, and thus, the supplied lubricant lubricates and cools both bearings 21 and 22. The liquid lubricant after lubricating and cooling both bearings 21 and 22 flows from the interior of each of the bearings 21 and 22 toward the outside. Subsequently this liquid lubricant together with the excessive lubricant discharged from the cavity 2 of the spindle 1 via the annular gap 20 is collected, via a lubricant return line, by the lubricant-temperature controller 16 in which all lubricant is subjected to a temperature control treatment, and thereafter, the liquid lubricant is supplied to the lubricant supply piping 4 for a re-use as a lubricant and a coolant of the rolling-contact type bearings 21 and 22. The above-mentioned excessive lubricant discharged from the cavity 2 via the annular gap 20 is pumped by a suction pump 32 to be forcibly returned to the lubricant-temperature controller 16 via the lubricant return line as shown in FIG. 3.

At this stage, it should be understood that an amount of supply of the liquid lubricant flowing from the lubricant supply piping 4 into the cavity 2 of the spindle 1 is always set larger than that required for achieving the lubricating and cooling of the bearings 21 and 22. Therefore, when the spindle 1 is in operation, the cavity 2 of the spindle 1 is always fully filled with the lubricant, and the excessive amount of the lubricant is urged to flow from the cavity 2 toward the exterior of the spindle 1 via the annular gap 20 to thereby prevent an air from coming into the cavity 2 from the atmosphere via the annular gap 20.

The lubricant-temperature controller 16 accommodates a lubricant delivery pump therein, capable of supplying the liquid lubricant sufficient for always filling the cavity 2 of the spindle 1 during the lubricating and cooling of the front and rear side bearings 21 and 22. Accordingly, the air of the atmosphere is not permitted to enter the cavity 2 via the annular gap 20, and as a result, an uneven existence of the liquid lubricant within the axial cavity 2 of the spindle 1 does not occur. Namely, the two bearings 21 and 22 are evenly and sufficiently lubricated and cooled by the liquid lubricant. If more than two bearings are arranged for supporting the spindle 1, these bearings can be similarly lubricated and cooled by the liquid lubricant supplied from the axial cavity 2 of the spindle 1.

In one example of the spindle bearing cooling apparatus according to the embodiment of FIGS. 3 and 4, the spindle 1 was rotated at a high rotating speed such that, when an amount of supply of the liquid lubricant by the lubricant supply piping 4 into the cavity 2 was set at 20 liters per a minute, an amount of supply of the lubricant from the cavity 2 to each of the bearings 21 and 22 via respective radial lubricant passageways 10 was expected to be at approximately 1.0 liter per a minute, and an amount of the excessive lubricant discharged from the cavity 2 via the annular gap 20 was expected to be at approximately 18 liters per a minute. As a result, it was experimentarily confirmed that the two bearings 21 and 22 can be always supplied with an approximately equal amount of the liquid lubricant. Namely, it was confirmed that the liquid lubricant level in the cavity 2 of the spindle 1 is always maintained at an equal level at every position along the axis of the cavity 2. The method of collecting an excessive lubricant from the cavity 2 of the spindle 1 via the annular cavity 20 adopted in the experiment will be later described.

In the above-described embodiment of the spindle bearing cooling apparatus, the radial lubricant passageways 14 of the inner race 23 of each of the bearings 21 and 22 are pierced therethrough to thereby establish passageways for supplying the lubricant from the cavity 2 of the spindle 1 to the interior of each bearing 21 or 22. Nevertheless, these radial lubricant passageways 14 may be omitted when the radial lubricant passageways 10 and the annular grooves 27 of the spindle 1 are provided in such an arrangement that the liquid lubricant urged to flow from the cavity 2 is directly routed to openings formed in the spindle 1 and the cylindrical spacing member at positions adjacent to openings between the inner and outer races 23 and 24 of each of the bearings 21 and 22. Then, the lubricant can be directly spouted from the openings of the spindle 1 and the cylindrical spacing member toward the interior of the bearings 21 and 22 to lubricate and cool them in the same manner as the method achieved by the afore-described embodiment of FIGS. 3 and 4.

It should further be understood that, in the embodiment of FIGS. 3 and 4, the radial lubricant passageways 10 of the spindle 1 and the radial lubricant passageways 14 of the inner race 23 of the bearing 21 or 22 may be arranged to be either circumferentially shifted from or in registration with one another in a plane perpendicular to the central axis "O" of the spindle 1.

The description of the supply of the liquid lubricant by a lubricant supply piping at the rear end of the spindle 1 will be hereinbelow described with reference to various embodiments different from the afore-described embodiments.

Figure 5A:
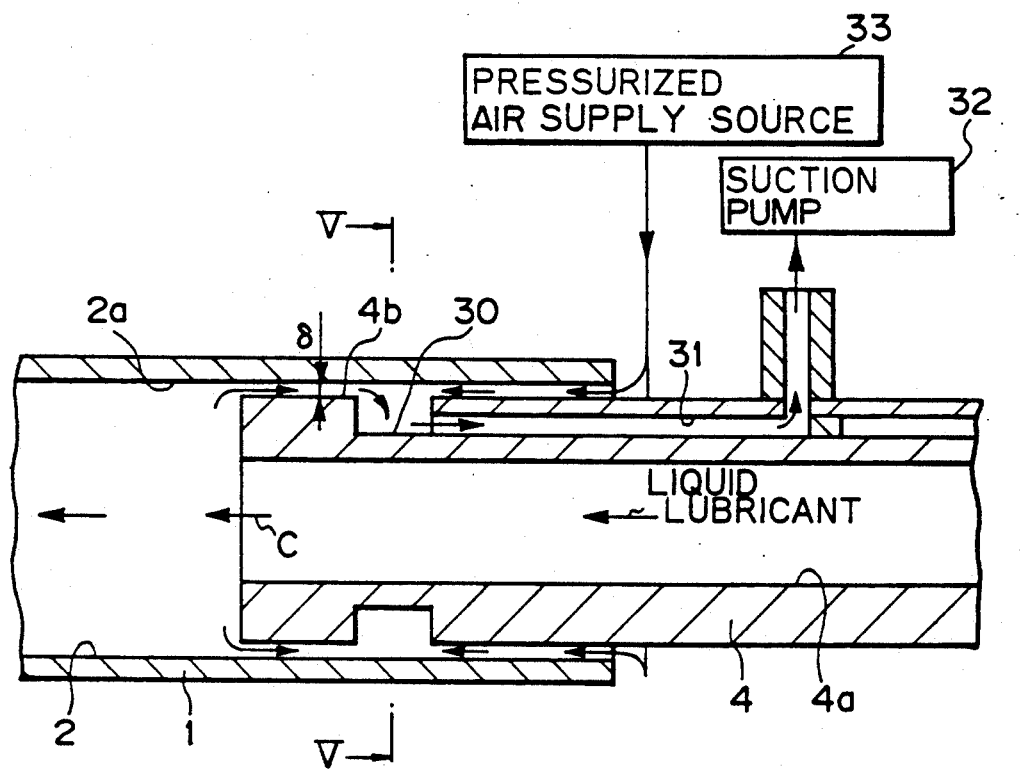
FIG. 5A is a cross-sectional view of an rear end portion of a spindle rotatably supported by bearings to be cooled by a liquid lubricant, illustrating an air seal construction provided between a lubricant supply piping and the rear end of the spindle according to an embodiment of the present invention.
Figure 5B:
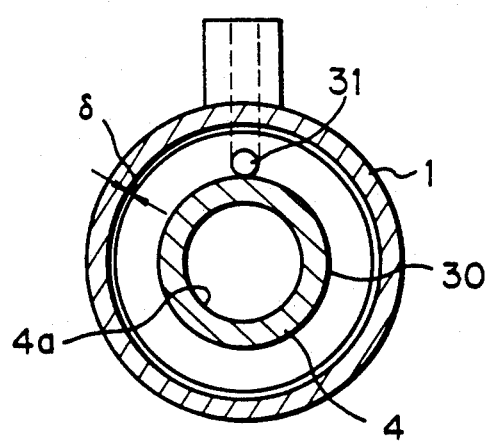
FIG. 5B is a cross-sectional view taken along the line V—V of FIG. 5A.

Referring to FIGS. 5A and 5B, a lubricant supply piping 4 provided with a central bore 4a has an end portion thereof concentrically inserted in a cylindrical rear end portion of an axial cavity 2 of a spindle 1. it should be understood that the lubricant supply piping 4 is a fixedly arranged piping for supplying a liquid lubricant from a liquid supply source, such as a lubricant delivery pump. A cylindrical inner wall 2a of the cavity 2 of the spindle 1 and a cylindrical outer circumference 4b of the end portion of the lubricant supply piping 4 are radially spaced from each other by a cylindrically extending radial gap designated by "δ", and having a radial clearance of approximately 20 through 100 microns (μm). In the present embodiment, a liquid lubricant for lubricating and cooling the spindle 1 and bearing elements ( not illustrated in FIGS. 5A and 5B ) for rotatably supporting the spindle 1 is supplied into the cavity 2 of the spindle 1, as shown by an arrow mark "C", by the piping 4. The liquid lubricant supplied into the cavity 2 of the spindle 1 is pressurized to have a predetermined pressure level sufficient for overcoming a resistance acting on the flow of the liquid lubricant, and therefore when the liquid lubricant is supplied into the cavity 2 of the spindle 1, a part thereof overflows from the cavity 2, and easily enters the cylindrical gap "δ" from the innermost end of the piping 4, as shown by arrows, and thus the lubricant in the cylindrical gap will be urged to flow toward the exterior of the spindle 1 from the rearmost end of the spindle 1 and if a means of preventing such a flow of the lubricant is not provided, the lubricant will leak from the rearmost end of the spindle 1 toward the exterior thereof.

Therefore, the piping 4 is provided with an annularly recessed groove 30 formed in an outermost cylindrical face 4b thereof, and a lubricant suction passageway 31 ( see FIG. 5B ) communicated with the annular groove 30 for drawing the lubricant therethrough. Namely, due to the provision of the annular groove 30 and the lubricant suction passageway 31, the liquid lubricant entering the cylindrical gap "δ" is held first by the annular groove 30, and subsequently drawn by a liquid suction pump 32 connected to the suction passageway 31. While the liquid suction pump 32 is operated to draw the liquid lubricant from the annular groove 30 of the piping 4, an air is also drawn from the atmosphere into the cylindrical gap "δ" via the opening of the rearmost end of the spindle 1 under the effect of suction of the suction pump 32 to form a constant flow of the air directed from the outermost end of the spindle 1 toward the annular groove 30. This flow of the air acts as an air seal for preventing the liquid lubricant from leaking from the cavity 2 of the spindle 1 toward the exterior of the spindle 1 via the cylindrical gap "δ" and the rearmost end of the spindle 1. The flow of the air per se is mixed with the liquid lubricant in the annular groove 30 of the piping 4, and drawn integrally by the liquid suction pump 32. This arrangement of FIGS. 5A and 5B can be used with the afore-mentioned embodiment of FIGS. 3 and 4 to prevent the leakage of the liquid lubricant from the cavity 2 of the spindle 1 toward the exterior of the spindle 1 via the annular gap 20.

With respect to the above-described embodiment of FIGS. 5A and 5B, it should be noted that the air drawn from the atmosphere into the cylindrical gap "δ" to prevent the leakage of the lubricant must not contain any foreign matter such as dust and oil mist which might cause a clogging of the cylindrical gap "δ" between the lubricant supply piping 4 and the spindle 1. Accordingly, when the atmosphere is not clean, a clean air under a slight pressure should be supplied from an appropriate pressurized air supply source 33 via a suitable air conduit connecting between the air supply source 33 and the cylindrical gap.

Figure 6:
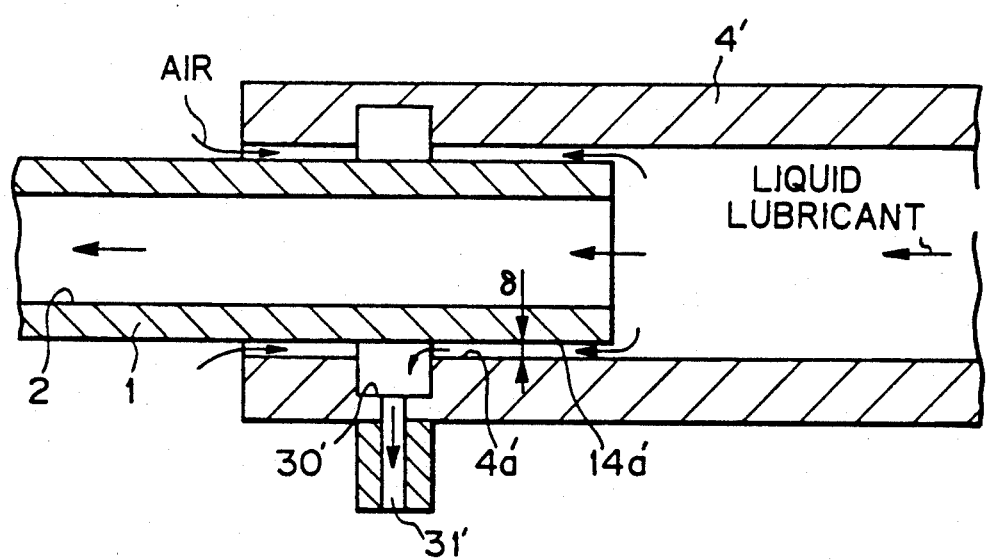
FIG. 6 is a cross-sectional view similar to FIG. 5, illustrating an air seal construction according to another embodiment of the present invention.

FIG. 6 illustrates a different embodiment of an arrangement for supplying a liquid lubricant by a lubricant supply piping at the rear end of a spindle rotatably supported by rolling-contact type bearings.

In the embodiment of FIG. 6, a liquid lubricant is supplied from a lubricant supply piping 4' into a hollow spindle 1. As clearly shown in FIG. 6, the lubricant supply piping 4' has an inner diameter larger than an outer diameter of the spindle 1, and therefore, a given length of a rear end of the spindle 1 is inserted into an end portion of the lubricant supply piping 4' under such a condition that a small cylindrical gap "δ" is given between the outer cylindrical face of the spindle 1 and the inner cylindrical wall of the piping 4'. The cylindrical gap "δ" is of approximately 20 through 100 microns. The lubricant supply piping 4' is provided with an annular recess 30' formed in an inner wall 4a' so that the annular recess 30' is located at a position inwardly a halfway the whole length of fitting the piping 4' and the spindle 1 from the frontmost end of the piping 4'. The annular recess 30' of the lubricant supply piping 4' is provided with an opening formed at a bottom thereof to be communicated with a suction line 31', and therefore when an amount of the liquid lubricant supplied by the lubricant supply piping 4' is excessive in comparison with an actual amount of the lubricant supplied for lubricating and cooling the bearings and the spindle 1, the excess liquid lubricant is collected through the suction line 31'. Air flowing from the exterior into the annular gap is able to act as an air seal in the same manner as the above-mentioned embodiment of FIGS. 5A and 5B.

FIG. 7 illustrates a spindle cooling apparatus of a machine tool according to an embodiment of the present invention.

In the embodiment of FIG. 7, a hollow spindle 1 is provided with an end, i.e., a rear end in which an end of a lubricant supply piping 40 is inserted to supply a liquid lubricant for cooling the spindle 1. The piping 40 has a central bore 40a through which the liquid lubricant is supplied into a hollow cylindrical tube member 50 arranged in the spindle 1 to be rotated with the spindle 1. The supplied liquid lubricant flowing through the cylindrical tube member 50 is turned at an end (not illustrated in FIG. 7) of the cylindrical tube member 50 to return through an annular spacing extending between an outer circumference of the cylindrical tube member 50 and an inner wall of the hollow spindle 1 until it reaches the end of the lubricant supply piping 40. The liquid lubricant subsequently enters an annular return passageway 41 arranged around the central bore 40a and returns to a liquid lubricant supply source ( not shown in FIG. 7 ).

In the above-mentioned arrangement of the spindle 1, the end of the lubricant supply piping 40 is fitted over the cylindrical outer face of the hollow cylindrical tube member 50 via a small radial gap δ' ( approximately 20 through 100 microns ) cylindrically extending around the cylindrical outer face of the tube member 50. The end of the lubricant supply piping 40 is also inserted inside the hollow spindle 1 via a small radial gap δ ( approximately 20 through 100 microns ). The lubricant supply piping 40 is provided with an annularly recessed groove 42 formed in the outermost cylindrical face 40b of the lubricant supply piping 40 at a position located axially halfway the inserted portion of the end of the piping 50. The annularly recessed groove 42 is communicated with a lubricant suction passageway 43 formed in the liquid supply piping 40 in a manner similar to the lubricant suction passageway 31 of the embodiment of FIGS. 5A and 5B.

When the liquid lubricant is supplied from the central bore 40a of the supply piping 40 into the tube member 50 during the rotating thereof, a part of the liquid lubricant flows, via the cylindrical gap between the piping 40 and the tube member 50, into the spindle 1, and is mixed with the returning liquid lubricant therein. The liquid lubricant returning from the end of the tube member 50 enters the annular return passageway 41 and the cylindrical gap between the lubricant supply piping 40 and the inner wall of the spindle 1. Nevertheless, the liquid lubricant entering the cylindrical gap is collected through the annularly recessed groove 42 and the lubricant suction passageway 43 of the liquid supply piping 40 under the suction by a suction pump 32. Namely, an air seal effect similar to that of the embodiment of FIGS. 5A and 5B prevents the liquid lubricant from leaking from inside the spindle 1 toward the exterior. The liquid lubricant thus supplied into the spindle 1, and collected therefrom, cools the spindle 1.

Further, it should be appreciated that the air sealing arrangement of the embodiment of FIG. 7 is simple in construction due to the provision of only the annular groove 42 and the lubricant suction passageway 43, though three cylindrical elements, i.e., the hollow spindle 1, the lubricant supply piping 40 having both lubricant supply and return passageways, and the cylindrical tube member 50 for allowing the liquid lubricant to turn back at the end thereof must be arranged for cooling the spindle 1 by the use of the liquid lubricant for a machine tool.

Throughout the sealing arrangements for preventing a leakage of the liquid lubricant from inside the spindle toward the exterior according to the described embodiments of the present invention, the arrangements of FIGS. 5A, 5B and 6 may be effectively accommodated in the spindle bearing cooling apparatus of the embodiments of FIGS. 1 and 3, and the arrangement of FIG. 7 may be accommodated in the spindle bearing cooling apparatus according to the later described embodiments of FIGS. 8 and 9.

A description of further embodiments of the spindle bearing cooling apparatus will be provided hereinafter with reference to FIGS. 8A, 8B, 9A, and 9B.

As a rule, a rolling-contact type bearing rotatably supporting a spindle or a shaft is assembled in such a manner that an appropriate pre-load is applied to rolling elements arranged between inner and outer races by choosing a dimensional relationship between an outer diameter of the inner race and an inner diameter of the outer race. For example, with a given rolling-contact type bearing, under a condition where a force amounting to 10 kgf is given to the rolling elements due to the above-mentioned pre-load, when the spindle is rotated at 12,000 r.p.m., a large centrifugal force acts on the rolling elements of the bearing due to the high speed rotation of the bearing per se, and as soon as a temperature difference between the inner and outer races becomes three degrees centigrade, a compression acting on the rolling elements due to a thermal expansion of these inner and outer races rises to 200 kgf, and therefore, a seizing of the rolling elements occurs.

Figure 8B:
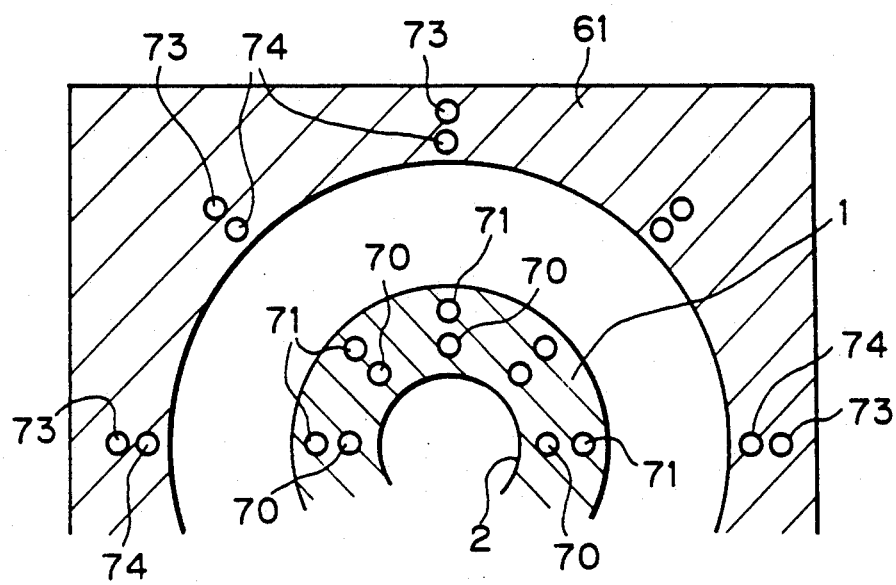
FIG. 8B is a cross-sectional view taken along the line VIII—VIII of FIG. 8A.

Referring now to FIGS. 8A and 8B, a spindle 1 of a machine tool is rotatably held by a housing 61 of a spindle head of a machine tool via rolling-contact type bearings 60. Each bearing 60 includes an inner race 62 tightly fitted on the outer circumference of the spindle 1, an outer race 63 fixedly fitted in an inner cylindrical wall of the housing 61, and rolling elements 64 rotatable arranged between the inner and outer races 62 and 63. When the spindle head is cooled by a natural or a forced convection of a coolant from the exterior of the spindle head, the spindle 1 enclosed by the housing 61 cannot be suitably cooled due to a difficulty in heat dissipation from the spindle 1 compared with the housing 61 of the spindle head, and the temperature of the spindle 1 increases in comparison with that of the housing 61 during the operation of the machine tool. Accordingly, the inner race 62 of the bearing 60 tightly fitted on the spindle 1 is heated by the temperature transmitted from the spindle 1 in addition to the heat generated by the bearing 60 per se, and thus the temperature of the inner race 62 becomes higher than that of the outer race 63 fixedly fitted in the housing 61. As a result, the thermal expansion of the inner race 62 is larger than that of the outer race 63, and accordingly, the rolling elements 64 between the inner and outer races 62 and 63 are compressed by these two races 62 and 63. Moreover, when the rotating speed of the spindle 1, and therefore the rotating speed of the bearings 60, increases, a centrifugal force acting on the rolling elements 64 increases.

Therefore, the rolling elements 64 are urged toward the track of the outer race 63, and thus subjected to a compression by the outer race 63, and accordingly, the rolling elements 64 are heated up during the rotation thereof due to an increased friction, and will eventually seize. Therefore, a proper cooling is required for preventing a seizing of the bearings 60 of the spindle 1.

In the spindle bearing cooling apparatus of FIGS. 8A and 8B, the cooling of the inner race 62 of each bearing 60 is accomplished by cooling the spindle 1 on which the inner races 62 are tightly fitted. Namely, a liquid lubricant is always circulated through the plurality of pairs of lubricant supply and return passageways 70 and 71 provided in the spindle 1 and axially extended in the cylindrical wall thereof. The plurality of lubricant supply and return passageways 70 and 71 in the form of the axially extended throughbores are arranged equiangularly with respect the central axis "C" of the spindle 1 as best shown in FIG. 8B. Each pair of lubricant supply and return passageways 70 and 71 is connected together at the ends thereof in the cylindrical wall of the front end portion of the spindle 1. The liquid lubricant is supplied by a temperature controller 72 for the lubricant ( hereinafter referred to as a lubricant-temperature controller ) after a temperature control treatment by the controller 72. At this stage, it should be understood that the rear end portion of the spindle 1 has a cooling liquid distributing system substantially similar to the spindle cooling system of FIG. 7. Namely, the liquid lubricant supplied by the lubricant-temperature controller 72 is introduced into the respective lubricant supply passageways 70 via the central bore 40a of a stationary lubricant supply piping 40, and the central bore 51 of a cylindrical tube member 50, and the lubricant passageway 54 of a lubricant distributing disk member 53. The cylindrical tube member 50 and the lubricant distributing disk member 53 are connected together at an innermost end of the tube member 50, and these integral members 50 and 53 are arranged into the interior of the bore of the spindle 1 to be rotated with the spindle 1.

The liquid lubricant flowing through the lubricant supply passageways 70, and returning from the respective lubricant return passageways 71 of the spindle 1 is collected through the annular return passageway 41 of the lubricant supply piping 40 to be returned to the lubricant-temperature controller 72. In addition, a part of the returning lubricant enters the radial gap "δ" and is collected through the annularly recessed groove 42 and the lubricant suction passageway 43 of the lubricant supply piping 40 by the suction of the suction pump 32. Therefore, a leakage of the lubricant from the radial gap "δ" is prevented by an air seal applied to the rearmost end of the spindle 1. The lubricant collected by the suction pump 32 may be either returned to the lubricant-temperature controller 72 or to a liquid lubricant supply tank ( not illustrated in FIG. 8A ).

During the circulation of the liquid lubricant through the supply and return passageways 70 and 71, the spindle 1 and the inner races 62 of the bearings 60 are cooled by the lubricant, and the lubricant is in turn cooled in the lubricant-temperature controller 72.

The housing 61 of the spindle head is provided with a plurality of pairs of lubricant supply and return passageways 73 and 74. The respective pairs of lubricant supply and return passageways 73 and 74 are arranged equidistantly in the circumferential direction with respect to the central axis "C" of the spindle 1, as shown in FIG. 8B. The two passageways 73 and 74 are connected together at the ends thereof, to permit the liquid lubricant to circulate through a lubricant-temperature controller 75 similar to the lubricant-temperature controller 72, and cool the housing 61 and the outer races 63 of the bearings 60 by removing heat therefrom during the rotation of the spindle 1. The temperature of the liquid lubricant is lowered and adjusted by the lubricant-temperature controller 75.

When the cooling of the inner and outer races 62 and 63 by the circulation of the liquid lubricant is carried out, it is necessary to avoid an occurrence of a difference in a thermal expansion of the inner and outer races 62 and 63 of each bearing 60, because such a difference of the thermal expansion of the inner and outer races 62 and 63 increases a compression acting on the rolling elements 64 and may cause a seizing of the rolling elements 64. In this respect, as described before, since a heat dissipation from the spindle 1 is less than that of the housing 61, the temperature of the liquid lubricant for cooling the spindle 1 and the inner races 62 must be lower than that of the liquid lubricant for cooling the housing 61 and the outer races 63. In the embodiment of FIG. 8, this is achieved by the operation of the two lubricant-temperature controllers 72 and 75. When the cooling effect applied to the outer races 63 of the bearings 60 is larger than that applied to the inner races 62 of the bearings 60, as set by the two lubricant-temperature controllers 72 and 75, the thermal expansion of the outer races 63 is relatively larger than that of the inner races 62, and accordingly, the compression acting on the rolling elements 64 can be mitigated to thereby prevent a seizing of the rolling elements 64.

Figure 9B:
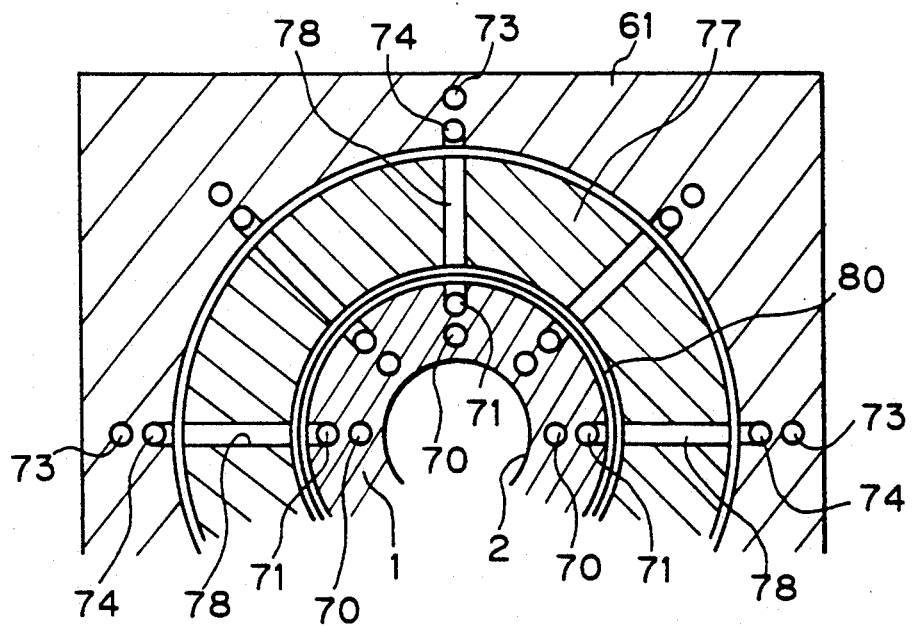
FIG. 9B is a cross-sectional view taken along the line IX—IX of FIG. 9A.

FIGS. 9A and 9B illustrate the spindle bearing cooling apparatus of a machine according another embodiment of the present invention.

In the embodiment of FIGS. 9A and 9B, a single temperature controller 76 for the lubricant is used for adjusting the temperature of the liquid lubricant and supplying the temperature-adjusted lubricant to axial lubricant supply and return passageways 70 and 71 of the spindle 1, and axial lubricant supply and return passageways 73 and 74 of the housing 61. The former axial lubricant supply and return passageways 70 and 71 of the spindle 1 are connected together at the ends thereof in the interior of the front end portion of the spindle 1, and further connected to the latter lubricant supply and return passageways 73 and 74 by connecting lubricant passageways 78 in the form of a plurality of radial through-holes provided in an annular member 77 arranged between the outer circumference of the spindle 1 and the inner cylindrical wall of the housing 61 of the spindle head and positioned rearward of the inner bearing 60. Namely, an outer circumference of the annular member 77 is fixed to the cylindrical inner wall of the housing 61 by an appropriate fixing member, such as a known snap ring, and an inner circumference of the annular member 77 is spaced apart from the rotating spindle 1.

The lubricant supply and return passageways 73 and 74 of the housing 61 are, of course, connected together at the ends thereof. Therefore, the liquid lubricant, the temperature of which is adjusted to a predetermined value by the lubricant-temperature controller 76, is first sent to the lubricant supply and return passageways 70 and 71 of the spindle 1, and further sent to the lubricant supply and return passageways 73 and 74 via the connecting lubricant passageways 78 of the annular member 77 to perform a cooling of the spindle 1, the inner races 62 of the bearing 60, the housing 61 and the outer races 63 of the bearings 60. After the completion of the above-mentioned cooling, the liquid lubricant returns to the lubricant-temperature controller 76 to be subjected to a temperature control treatment. The above-mentioned circulating flow of the liquid lubricant through the lubricant-temperature controller 76, the spindle 1, the annular member 77, and the housing 61 is able to provide a greater cooling effect of the inner races 62 than the outer races 63 of the bearings 60, and accordingly, mitigates a compression applied to the rolling elements 64 of the bearings to thereby prevent the afore-mentioned seizing of the bearings 60 during the rotation of the spindle 1 of the machine tool. Namely, the annular member 77 having the radial connecting lubricant passageways 78 enables a generation of a temperature difference between the flow of the liquid lubricant flowing through the spindle 1 and that flowing through the housing 61 of the spindle head.

A pressurized air supply source 79 is arranged for supplying a pressurized or compressed air to a gap 80 between the inner circumference of the annular member 77 and the outer face of the spindle 1 via air passageways 81 provided in the annular member 77 for providing the gap with an air seal to prevent a leakage of the liquid lubricant from the gap 80 during the flow of the liquid lubricant from the lubricant return passageway 71 of the spindle 1 toward the lubricant supply passageway 73 of the housing 61. Nevertheless, even if the lubricant is leaked from the gap 80 into the spacing between the spindle 1 and the housing 61 to wet the bearings 60, this has no adverse affect on the bearings 60, because the liquid lubricant for the cooling of the spindle 1 and the housing 61 is the same as the lubricant directly used for lubricating the bearings 60.

Figure 10:
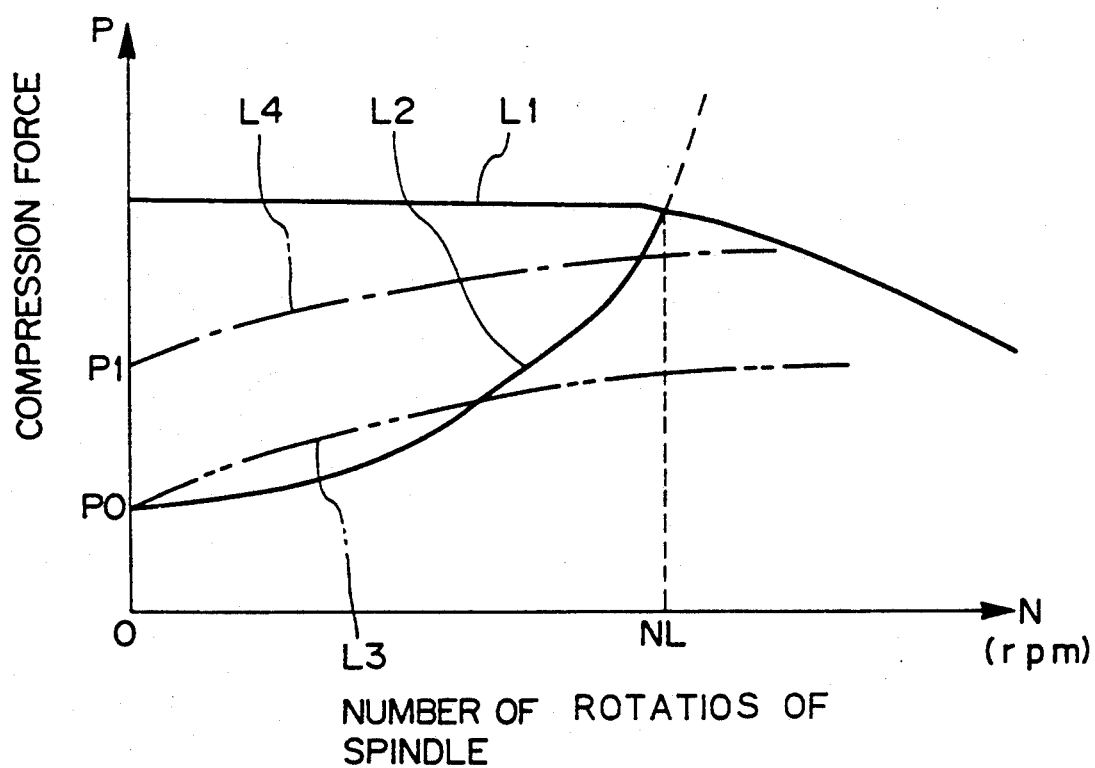
FIG. 10 is a graphical view illustrating an advantageous effect of the spindle bearing cooling apparatus according to an embodiment of the present invention.

FIG. 10 illustrates an advantageous effect of the spindle bearing cooling apparatus due to a lowering the temperature of the liquid lubricant for cooling the inner race 62 in comparison with the temperature of the liquid lubricant for cooling the outer race 63 of the bearing 60.

In the graph of FIG. 10, the ordinate indicates a compression force P acting on the rolling elements of the bearing, and the abscissa indicates the rotating speed of the spindle ( the number of rotation per a minute ). A solid line L1 indicates a boundary line beyond which the bearing cannot be used, and another solid line L2 typically indicates a change in the compression force acting on a bearing cooled by the prior cooling method. In the line L2, the compression force P is equal to a pre-load pressure P0 when the rotating speed is zero ( N=0).

When the present invention is used for cooling the spindle bearing of a machine tool under the application of the same pre-load P0 as the prior art to the bearings, the compression force P acting on the rolling elements of the bearings does not greatly increase with respect to a change in the rotating speed of the spindle, as shown by a two-dot chain line L3, and accordingly, the rotating speed of the spindle and the bearings can be increased to a sufficiently large number N of rotations. This means that the rotating speed of the bearing can be increased to a number NL corresponding to the limiting value of the case of the prior art even under a condition such that a pre-load applied to the bearings is set at a value P1 appreciably larger than the above-mentioned value P0, as shown by a one-dot chain line L4. Namely, by the application of a large pre-load to the bearing rotatably supporting the spindle, it is possible to increase a mechanical rigidity of the spindle of a machine tool, and therefore, an accuracy of the cutting machining of a product can be high during a heavy cutting operation of the machine tool at a low rotating speed of the spindle.

From the foregoing it will be understood that, in accordance with the present invention, the liquid lubricant can be flown or circulated in such a manner that an even and effective cooling effect is given to the entire surface of inner races of a rolling-contact type bearing rotatably supporting a spindle, and accordingly, a problem of an uneven cooling of the inner race of the bearing encountered by the prior art cooling method of spindle bearings can be solved, to thus prolong the operating life of the spindle bearing by the use of an economical amount of a liquid lubricant.

Further, when the liquid lubricant is supplied for cooling and lubricating rolling-contact type bearings via a cavity of a spindle, the cavity is always full of the lubricant, and accordingly, all bearings mounted on various positions on the outer circumference of the spindle along the longitudinal axis thereof can be equally cooled and lubricated by the supply of a sufficient amount of liquid lubricant. This solves another problem of the prior art cooling of the spindle bearings, i.e., an uneven distribution of a liquid lubricant with a change in the mounting position of a spindle bearing.

In accordance with the present invention, an effective air seal is provided for preventing a leakage of a liquid lubricant during the supply of the lubricant to the spindle cavity during the rotation of the spindle at a high speed. Therefore, a constant and effective cooling of the spindle bearing and the spindle per se can be achieved by an economical amount of liquid lubricant.

Still further, in accordance with the present invention, the temperature of the liquid lubricant for cooling the inner races of the spindle bearings is always maintained at a level lower than that of the lubricant for cooling the outer races of the spindle bearings, and accordingly, a seizing of the rolling elements of the bearings can be prevented. Therefore, the spindle can be stably rotated at a high speed, and further, the mechanical rigidity of a spindle, especially a spindle of a machine tool, can be increased due to an increase in a pre-load applied to the spindle bearings.

It should be understood that many modifications and variations will occur to a person skilled in the art without departing from the scope and sprit of the present invention defined by the accompanying claims.

We claim:
1. An apparatus for cooling a bearing for rotatably supporting a spindle of a machine by a liquid lubricant supplied to a cavity of the spindle, the bearing including an inner race fitted on an outer cylindrical face of the spindle, an outer race stationarily held in a housing element of the machine, and rolling elements rotatably held in tracks of the inner and outer races thereof, comprising in combination:
   a first means for permitting said liquid lubricant to flow from said cavity of said spindle toward said outer cylindrical face of said spindle when said spindle is rotated, said first means comprising at least one radical lubricant passageway provided in said spindle and radially extending from said cavity toward said outer cylindrical face of said spindle;
   a second means for permitting said liquid lubricant to flow in a circumferential direction on said outer cylindrical face of said spindle when said liquid lubricant flowing from said cavity of said spindle reaches said outer cylindrical face, said second means comprising an annularly extending recess provided in at least one of a cylindrical inner face of said inner race of said bearing and said outer cylindrical face of said spindle, said annularly extending recess being in communication with said radial lubricant passageway of said spindle; and a third means for permitting said liquid lubricant to be sprouted from said annularly extending recess into a space between said inner and outer races of said bearing to thereby permit said lubricant to come into contact with said rolling elements and said tracks of said inner and outer races when said spindle is rotated, said third means comprising at least one radial lubricant passageway provided in said inner race which radially extends from said annularly extending recess toward an outer face of said inner race having said track thereof, said radical lubricant passageway being spaced in a circumferential direction from said radial lubricant passageway of said spindle;

a fourth means for returning said liquid lubricant from said spacing between said inner and outer races of said bearing to a predetermined lubricant receiving means for receiving said liquid lubricant returned from said bearing and applying a temperature control treatment to said returned liquid lubricant; and a fifth means for routing said liquid lubricant after said temperature control treatment from said predetermined lubricant receiving means to said cavity of said spindle, thereby enabling said liquid lubricant for lubricating and cooling said bearing to be reused;

said fifth means comprising a liquid delivery pump having an outlet for delivering said liquid lubricant after said liquid has undergone said temperature control treatment under a predetermined pressure, a lubricant supply piping having one end connected to said outlet of said liquid delivery pump and the other end connected to an opening of an end of said spindle for supplying said liquid lubricant delivered by said liquid delivery pump into said cavity of said spindle, said other end of said lubricant supply piping being spaced relative to said opening of said end of said spindle to provide a small cylindrical gap therebetween when said spindle is rotated, a means for setting an amount of liquid lubricant delivered from said liquid delivery pump at a predetermined value which is larger than an amount of said liquid lubricant supplied to said bearing through said first through third means, and a lubricant collecting means for collecting any excess liquid lubricant with respect to said liquid lubricant supplied to said bearing which returns said collected excess liquid lubricant to said lubricant receiving means.

2. An apparatus for cooling a spindle bearing of a machine, according to claim 1, wherein said gap is a cylindrical gap between said other end of said lubricant supply piping and said open end of said spindle between about 20 microns and about 100 microns measured radially.

3. An apparatus for cooling a spindle bearing of a machine, according to claim 1, wherein said lubricant collecting means comprises a liquid suction pump having a suction end fluidly connected to said cylindrical gap.

4. An apparatus for cooling a spindle bearing of a machine, according to claim 3, wherein the other end of said lubricant supply piping includes a portion thereof having a predetermined length and inserted inside said end of said spindle through said opening thereof while forming a cylindrical gap therebetween having an axial length substantially equal to said predetermined length of said portion of said other end of said lubricant supply piping, and wherein said portion of said other end of said lubricant supply piping is provided with an annularly recessed groove formed therein for receiving therein said excess liquid lubricant during the collecting of said excess liquid lubricant, and a lubricant collecting passageway in fluid communication with said annularly recessed groove for allowing said excess liquid lubricant to flow from said annularly recessed groove of said lubricant supply piping toward said lubricant collecting means when suction is exerted upon said liquid lubricant by said liquid suction pump of said lubricant collecting means.

5. An apparatus for cooling a spindle bearing of a machine, according to claim 4, wherein a pressurized air supply means is provided for supplying said cylindrical gap between said portion of said other end of said lubricant supply piping and said end of said spindle with pressurized air from said opening of said end of said spindle to prevent leakage of said excess liquid lubricant from said cavity of said spindle to the exterior of said spindle via said annular air gap, said pressurized air being mixed with said excess liquid lubricant in said annularly recessed groove of said lubricant supply piping and flowing toward said lubricant collecting means.

6. An apparatus for cooling a spindle bearing of a machine, according to claim 3, wherein the other end of said lubricant supply piping includes a portion thereof having a predetermined length and axially fitted on an outer cylindrical face of said end of said spindle while forming a cylindrical gap therebetween having an axial length substantially equal to said predetermined length of said portion of said other end of said lubricant supply piping, and wherein said portion of said other end of said lubricant supply piping is provided with an annularly recessed groove formed therein which extends radially about at least a portion of said outer cylindrical face of said end of said spindle for receiving therein said excess liquid lubricant during the collecting of said excessive liquid lubricant, and a lubricant collecting passageway in fluid communication with said annularly recessed groove for allowing said excess liquid lubricant to flow from said annularly recessed groove of said lubricant supply piping toward said lubricant collecting means when suction is exerted upon said liquid lubricant by said liquid suction pump of said lubricant collecting means.

7. An apparatus for cooling a spindle bearing of a machine, according to claim 6, wherein a pressurized air supply means is provided for supplying said cylindrical gap between said portion of said other end of said lubricant supply piping and said outer cylindrical face of said end of said spindle with pressurized air from an opening of said other end of said lubricant supply piping to prevent leakage of said liquid lubricant from said lubricant supply piping through said cylindrical gap, said pressurized air being mixed with said liquid lubricant in said annularly recessed groove of said lubricant supply piping and flowing toward said lubricant collecting means.

8. An apparatus for cooling a bearing for rotatable supporting a spindle in a housing of a machine by the use of a liquid lubricant supplied in an axially extending cavity of the spindle, the bearing including an inner race fitted on an outer cylindrical face of the spindle, an outer race stationarily seated in the housing, and rolling elements rotatably held between the inner and outer races thereof, comprising:
- a first means for supplying said axially extending cavity of said spindle with the liquid lubricant through an end of said spindle from an exterior of said spindle;
- a second means for permitting said liquid lubricant to flow from said axially extending cavity of said spindle toward an interior of said bearing, said second means comprising lubricant passageways running radially from said cavity of said spindle toward said interior of said bearing through said spindle and said inner race of said bearing;
- a lubricant returning means for permitting said liquid lubricant to return from said interior of said bearing to said first means;
- a flow regulating means for setting an amount of supply of said liquid lubricant from said first means to said axially extending cavity of said spindle at a value larger than an amount of said liquid lubricant passing through said lubricant passageways of said spindle and said inner race of said bearing;
- a third means for collecting excess liquid lubricant overflowing from said axially extending cavity of said spindle through said end of said spindle, said third means returning said collected lubricant to said first means; and
- a temperature controller for applying a temperature control treatment to said liquid lubricant before said liquid lubricant is supplied by said first means to said spindle.

9. An apparatus for cooling a bearing for rotatably supporting a spindle according to claim 8,
wherein said first means comprises a liquid delivery pump means having a predetermined liquid delivery capacity sufficient to constantly and fully fill said axially extending cavity of said spindle, and wherein said flow regulating means comprises a flow regulator for adjusting an amount of liquid lubricant delivered by said liquid delivery pump means of said first means.

10. An apparatus for cooling a bearing for rotatably supporting a spindle according to claim 8, wherein said first means comprises a lubricant supply piping including an axial end portion having an outlet through which said liquid lubricant is supplied into said cavity of said spindle, said axial portion of said lubricant supply piping inserted in said spindle with a cylindrical gap therebetween, said lubricant supply piping being provided with an annularly extending groove formed in an outer face of said axial portion thereof for receiving said excess liquid lubricant overflowing from said cavity of said spindle, and a lubricant suction passageway in fluid communication with said annularly extending groove and a lubricant suction line connected to said third means.

11. An apparatus for cooling a bearing for rotatably supporting a spindle in a housing of a machine by a liquid lubricant supplied in an axially extending cavity of the spindle, the bearing including an inner race tightly fitted on an outer cylindrical face of the spindle, an outer race stationarily seated in the housing, and rolling elements rotatably held between the inner and outer races thereof, comprising:
- a first means for generating a first flow of a temperature controlled liquid lubricant through an interior of said spindle to thereby cool said inner race of said bearing;
- a second means for generating a second flow of a temperature controlled liquid lubricant through an interior of said housing of said machine to thereby cool said outer race of said bearing; and
- a third means for setting a temperature of said first flow of the temperature controlled liquid lubricant at a level lower than that of said second flow of the temperature controlled liquid lubricant.

12. An apparatus for cooling a bearing for rotatably supporting a spindle according to claim 11,
wherein said first means comprises a plurality of pairs of axial lubricant supply and return passageways formed in said spindle at portions inside and adjacent to said outer cylindrical face thereof, said lubricant supply and return passageways of said spindle having one end thereof, respectively, connected together to convey said first flow of said liquid lubricant therebetween, and the other ends opening at an end of said spindle, and
wherein said second means comprises a plurality of pairs of axial lubricant supply and return passageways formed in said housing at portions inside and adjacent to an inner cylindrical wall thereof, said lubricant supply and return passageways of said housing having one end thereof, respectively, connected together to convey said second flow of said liquid lubricant therebetween, and the other ends opening at an end of said housing.

13. An apparatus for cooling a bearing for rotatably supporting a spindle according to claim 12,
wherein said plurality of pair of axial lubricant supply and return passageways formed in said spindle are arranged equiangularly around a central axis of said spindle, and
wherein said plurality of pairs of axial lubricant supply and return passageways formed in said housing are arranged equiangularly around a central axis of said spindle.

14. An apparatus for cooling a bearing for rotatably supporting a spindle according to claim 11, wherein said first and second means comprise a lubricant temperature controller, respectively, said lubricant temperature controller of said first means applying a temperature control treatment to said first flow of said liquid lubricant exteriorally of said spindle, and said lubricant temperature controller of said second means applying a temperature control treatment to said second flow of said liquid lubricant exteriorally of said spindle.

15. An apparatus for cooling a bearing for rotatably supporting a spindle according to claim 11,
wherein said first means comprises a lubricant temperature controller for applying a temperature control treatment to said first flow of said liquid lubricant exteriorally of said spindle, and a lubricant supply conduit means for permitting said first flow of said liquid lubricant to flow from said temperature controller toward said interior of said spindle,
wherein said second means comprises a lubricant return conduit means for permitting said second flow of said liquid lubricant to return from said interior of said housing to said temperature controller of said first means, and wherein said third means comprises a lubricant connecting conduit means for routing said first flow of said liquid lubricant from said interior of said spindle to said interior of said housing, wherein said second flow of said liquid lubricant has a temperature higher than said first flow of said liquid lubricant.

16. An apparatus for cooling a bearing for rotatably supporting a spindle according to claim 15, wherein said first means comprises a pair of cylindrical lubricant supply and return passageways formed in said spindle at portions inside and adjacent to said outer cylindrical face thereof, said lubricant supply and return passageways of said spindle having one end thereof, respectively, connected together to turn said first flow of said liquid lubricant, and the other ends forming an lubricant inlet and a lubricant outlet, wherein said second means comprises a pair of cylindrical lubricant supply and return passageways formed in said housing at portions inside and adjacent to an inner cylindrical wall thereof, said lubricant supply and return passageways of said housing having one end thereof, respectively, connected together to turn said second flow of said liquid lubricant, and the other ends forming a lubricant inlet and a lubricant outlet, respectively, and wherein said lubricant connecting conduit means of said third means comprises an annular member arranged between said outer cylindrical face of said spindle and an inner cylindrical wall of said housing confronting said outer cylindrical face of said spindle, said annular member being provided with a lubricant passageway for connecting between said outlet of said return passageway of said first means and said inlet of said supply passageway of said second means.

17. An apparatus for cooling a bearing for rotatably supporting a spindle according to claim 16, wherein a pressurized air supply means is provided for applying an air seal to said annular member around a connecting portion of said outlet of said return passageway of said first means and said inlet of said supply passageway of said second means.

18. An apparatus for cooling a bearing for rotatably supporting a spindle according to claim 11, wherein said first means comprises:

a stationary lubricant supply piping having a cylindrical lubricant supply passageway axially extending therein, a front end portion thereof inserted in an open end of said axial cavity of said spindle with a radial gap therebetween to keep said stationary lubricant supply piping from contacting said spindle, a rear end portion thereof through which said first flow of said temperature controlled liquid lubricant is introduced into said cylindrical lubricant supply passageway, and an annular lubricant return passageway arranged around and coaxial with said cylindrical lubricant supply passageway;

a liquid distributing means arranged in a center of said axial cavity of said spindle which is rotatable with said spindle, said liquid distributing means including a hollow cylindrical tube member inserted in said front end portion of said stationary lubricant supply piping to receive said first flow of said temperature controlled liquid lubricant from said stationary lubricant supply piping, and a lubricant distributing disk having therein lubricant passageways for delivering said first flow of temperature controlled liquid lubricant toward said interior of said spindle, said hollow cylindrical tube member defining a lubricant return passageway between an outer circumference thereof and a cylindrical wall of said axial cavity of said spindle for returning said first flow of a temperature controlled liquid lubricant from said interior of said spindle toward said annular lubricant return passageway of said stationary lubricant supply piping; and a liquid lubricant suction means for urging a part of said first flow of temperature controlled liquid lubricant leaking from said radial gap toward an exterior of said spindle.

19. An apparatus for cooling a bearing for rotatably supporting a spindle according to claim 18, wherein said liquid lubricant suction means comprises a lubricant receiving recess annularly formed in said front end portion of said stationary lubricant supply piping, an axial lubricant passageway formed in said front end portion of said stationary lubricant supply piping, and a liquid suction line connected to a liquid suction pump located exteriorally of said spindle.

20. An apparatus for cooling both a bearing for rotatably supporting a spindle of a machine and the spindle bearing related thereto by a liquid lubricant directly supplied to a cavity of the spindle defined by an axially extending cylindrical wall formed in the spindle, the bearing including an inner race fitted on an outer cylindrical face of the spindle, an outer race stationarily held in a housing element of the machine, and rolling elements rotatably held in tracks of the inner and outer races thereof, comprising in combination:

said cavity which comprises at least one axial passageway extending a substantial portion of the length of said spindle and providing for direct contact of said liquid lubricant with said spindle such that said spindle is cooled as said liquid lubricant passes through said axial passageway;

a first means for permitting said liquid lubricant to flow from said cavity of said spindle toward said outer cylindrical face of said spindle when said spindle is rotated, said first means comprising at least one radial lubricant passageway provided in said spindle and radially extending from said cavity toward said outer cylindrical face of said spindle;

a second mans for permitting said liquid lubricant to flow in a circumferential direction on said outer cylindrical face of said spindle when said liquid lubricant flowing from said cavity of said spindle reaches said outer cylindrical face, said second means comprising an annularly extending recess provided in at least one of a cylindrical inner face of said inner race of said bearing and said outer cylindrical face of said spindle, said annularly extending recess being in communication with said radial lubricant passageway of said spindle; and a third means for permitting said liquid lubricant to be spouted from said annularly extended recess into a space between said inner and outer races of said bearing to thereby permit said lubricant to come into contact with said rolling elements and said tracks of said inner and outer races when said spindle is rotated, said third means comprising at least one radial lubricant passageway provided in said inner race to radially extend from said annularly extended recess toward an outer cylindrical face of said inner race having said track thereof, said radial lubricant passageway being spaced in a circumferential direction from said radial lubricant passageway of said spindle.

21. An apparatus for cooling both a spindle bearing of a machine and the spindle relating thereto according to claim 20, further comprising a fourth means for returning said liquid lubricant from said spacing between said inner and outer races of said bearing to a predetermined lubricant receiving means for receiving said liquid lubricant returned from said bearing and applying a temperature control treatment to the returned liquid lubricant.

22. An apparatus for cooling a spindle bearing of a machine, according to claim 21, further comprising a fifth means for routing said liquid lubricant after said temperature control treatment from said predetermined lubricant receiving means to said cavity of said spindle, thereby enabling said liquid lubricant for lubricating and cooling said bearing to be reused.

* * * * *

UNITED STATES PATENT AND TRADEMARK OFFICE
CERTIFICATE OF CORRECTION

PATENT NO. : 5,192,139

DATED : March 9, 1993

INVENTOR(S) : Hiramoto, et al.

It is certified that error appears in the above-identified patent and that said Letters Patent is hereby corrected as shown below:

IN THE ABSTRACT ON THE TITLE PAGE

Line 8, "element" should read -- elements --, and "recess" should read -- races --.

Column 18, line 63, "radical" should read -- radial --.

Column 19, line 10, "sprouted" should read -- spouted --.

Column 19, line 19, "radical" should read -- radial --.

Column 22, line 1, delete "tightly".

Column 22, line 39, "pair" should read -- pairs --.

Column 24, line 50, "mans" should read -- means --.

Signed and Sealed this

Twenty-first Day of December, 1993

Attest:

BRUCE LEHMAN

Attesting Officer

Commissioner of Patents and Trademarks